(12) United States Patent
Homma et al.

(10) Patent No.: US 11,713,727 B2
(45) Date of Patent: Aug. 1, 2023

(54) ENGINE SYSTEM

(71) Applicant: KABUSHIKI KAISHA TOYOTA JIDOSHOKKI, Kariya (JP)

(72) Inventors: Takayuki Homma, Aichi-ken (JP); Yoshitaka Takeuchi, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 130 days.

(21) Appl. No.: 17/440,031

(22) PCT Filed: Mar. 18, 2020

(86) PCT No.: PCT/JP2020/011884
§ 371 (c)(1),
(2) Date: Sep. 16, 2021

(87) PCT Pub. No.: WO2020/196133
PCT Pub. Date: Oct. 1, 2020

(65) Prior Publication Data
US 2022/0170415 A1  Jun. 2, 2022

(30) Foreign Application Priority Data
Mar. 26, 2019 (JP) ................................ 2019-058410

(51) Int. Cl.
*F02D 19/06* (2006.01)
*F02B 51/02* (2006.01)
(Continued)

(52) U.S. Cl.
CPC .......... *F02D 19/0671* (2013.01); *F02B 51/02* (2013.01); *F02D 19/021* (2013.01);
(Continued)

(58) Field of Classification Search
CPC ....................... F02D 19/0671; F02M 21/0227
See application file for complete search history.

(56) References Cited

U.S. PATENT DOCUMENTS

| 11,421,629 B2 * | 8/2022 | Takeuchi | ............... F02M 21/02 |
| 11,578,686 B2 * | 2/2023 | Takeuchi | ............ F02D 19/0628 |

(Continued)

FOREIGN PATENT DOCUMENTS

| AU | 2020249395 A1 * | 9/2021 | ........... F02D 33/006 |
| AU | 2019445332 A1 * | 10/2021 | ......... F02M 21/0206 |

(Continued)

*Primary Examiner* — Kevin R Steckbauer
(74) *Attorney, Agent, or Firm* — Sughrue Mion, PLLC

(57) ABSTRACT

An engine system includes an engine having a combustion chamber, an intake gas passage through which air to be supplied to the combustion chamber flows, an exhaust gas passage through which exhaust gas generated from the combustion chamber flows, a reformer configured to reform the fuel to generate a reformed gas containing hydrogen, a gas supply passage through which air to be supplied to the reformer flows, a bypass passage connected to the gas supply passage and the exhaust gas passage so as to bypass the reformer and through which the fuel having passed through the reformer is circulated to an upstream of the reformer, and a switching valve switched between a normal position that does not allow the fuel having passed through the reformer to flow to the bypass passage and a circulating position that allows the fuel having passed through the reformer to flow to the bypass passage.

8 Claims, 6 Drawing Sheets

(51) Int. Cl.
  *F02D 19/02*    (2006.01)
  *F02M 21/02*    (2006.01)
  *F02M 27/02*    (2006.01)
(52) U.S. Cl.
  CPC ........... *F02D 19/06* (2013.01); *F02D 19/061* (2013.01); *F02D 19/0644* (2013.01); *F02M 21/0206* (2013.01); *F02M 21/0209* (2013.01); *F02M 21/0227* (2013.01); *F02M 21/0248* (2013.01); *F02M 27/02* (2013.01)

(56) References Cited

U.S. PATENT DOCUMENTS

| | | | | |
|---|---|---|---|---|
| 2004/0144337 | A1* | 7/2004 | Wakao | F02M 25/12 123/3 |
| 2014/0311428 | A1 | 10/2014 | Miyagawa | |
| 2015/0075451 | A1* | 3/2015 | Inuzuka | F02B 43/12 123/3 |
| 2019/0345901 | A1* | 11/2019 | Lee | F02D 41/0072 |
| 2022/0163002 | A1* | 5/2022 | Takeuchi | F02M 21/0227 |
| 2022/0170415 | A1* | 6/2022 | Homma | F02D 19/0644 |
| 2022/0170433 | A1* | 6/2022 | Takeuchi | F01P 7/16 |
| 2022/0205415 | A1* | 6/2022 | Takeuchi | F02D 19/0628 |

FOREIGN PATENT DOCUMENTS

| | | | | |
|---|---|---|---|---|
| AU | 2020249938 A1 | * | 10/2021 | ............. F02B 51/02 |
| CN | 110360026 B | * | 3/2021 | |
| CN | 113614348 A | * | 11/2021 | ........... F02D 33/006 |
| CN | 113631806 A | * | 11/2021 | ......... F02M 21/0206 |
| CN | 113646515 A | * | 11/2021 | .............. F02B 51/02 |
| CN | 113874609 A | * | 12/2021 | ......... F02M 21/0206 |
| CN | 114233526 A | * | 3/2022 | |
| CN | 114483333 A | * | 5/2022 | |
| CN | 114483333 B | * | 12/2022 | |
| JP | 2004251273 A | * | 9/2004 | ............. F02M 23/10 |
| JP | 2006052662 A | * | 2/2006 | |
| JP | 2007113421 A | * | 5/2007 | ........... F02D 19/061 |
| JP | 4251321 B2 | * | 4/2009 | ............. F02M 23/10 |
| JP | 2014-211155 A | | 11/2014 | |
| JP | 2020159211 A | * | 10/2020 | |
| JP | 2020159212 A | * | 10/2020 | ........... F02D 33/006 |
| JP | 2020159259 A | * | 10/2020 | .............. F02B 51/02 |
| JP | 2020172888 A | * | 10/2020 | |
| JP | 2020172906 A | * | 10/2020 | ......... F02M 21/0206 |
| JP | 2021042707 A | * | 3/2021 | |
| JP | 7074103 B2 | * | 5/2022 | |
| JP | 7124776 B2 | * | 8/2022 | ........... F02D 33/006 |
| JP | 7163853 B2 | * | 11/2022 | ......... F02M 21/0206 |
| WO | WO-2020195426 A1 | * | 10/2020 | |
| WO | WO-2020195427 A1 | * | 10/2020 | ........... F02D 33/006 |
| WO | WO-2020196133 A1 | * | 10/2020 | .............. F02B 51/02 |
| WO | WO-2020208876 A1 | * | 10/2020 | ......... F02M 21/0206 |
| WO | WO-2020209021 A1 | * | 10/2020 | |
| WO | WO-2020241604 A1 | * | 12/2020 | ......... F02M 21/0206 |
| WO | WO-2021049287 A1 | * | 3/2021 | |

* cited by examiner

US 11,713,727 B2

ENGINE SYSTEM

CROSS REFERENCE TO RELATED APPLICATION

This application is a National Stage of International Application No. PCT/JP2020/011884 filed Mar. 18, 2020, claiming priority based on Japanese Patent Application No. 2019-058410 filed Mar. 26, 2019, the contents of all of which are incorporated herein by reference in their entirety.

TECHNICAL FIELD

The present invention relates to an engine system.

BACKGROUND ART

As a conventional engine system, for example, a technique disclosed in Patent Document 1 has been known. An engine system disclosed in Patent Document 1 includes an engine using ammonia and hydrogen as fuel, a vaporizer vaporizing liquid ammonia, a cracker cracking ammonia vaporized by the vaporizer to generate hydrogen, an ammonia supply pipe supplying gaseous ammonia from the vaporizer to the cracker, an inlet pipe through which air is supplied to the cracker, an outlet pipe through which hydrogen generated by the cracker flows, an ammonia injection valve by which ammonia is injected into an intake gas passage of the engine, a hydrogen injection valve by which hydrogen is injected into the intake gas passage of the engine, and an NOx selective reduction catalyst connected to an exhaust pipe connected to an exhaust gas passage of the engine.

CITATION LIST

Patent Document

[Patent Document 1] Japanese Patent Application Publication No. 2014-211155

SUMMARY OF INVENTION

Technical Problem

However, the above-described prior art has the following problems. Specifically, at a start of the engine, ammonia (fuel) does not burn stably until warming up of the cracker is completed. Further, during the warming up of the cracker, in order to prevent abnormal oxidation of a catalyst of the cracker, it is necessary to supply only ammonia to the cracker or to supply ammonia to the cracker in a state where ammonia is rich with respect to air. Thus, ammonia passes through the cracker until the warming up of the cracker is completed, and as a result, ammonia is discharged from the engine. Therefore, a device for aftertreatment of ammonia need be provided in an exhaust system of the engine.

An object of the present invention is to provide an engine system that can prevent fuel from being discharged at a start of an engine.

Solution to Problem

An engine system according to one aspect of the present invention includes: an engine having a combustion chamber; an intake gas passage through which air to be supplied to the combustion chamber flows; an exhaust gas passage through which exhaust gas generated from the combustion chamber flows; a fuel injection valve from which a fuel is injected to the combustion chamber; a first throttle valve disposed in the intake gas passage and configured to control a flow rate of the air to be supplied to the combustion chamber; a reforming member configured to generate a reformed gas containing hydrogen by reforming the fuel; a gas supply passage through which air to be supplied to the reforming member flows; a fuel supply member configured to supply the fuel to the reforming member; a second throttle valve disposed in the gas supply passage and configured to control a flow rate of the air to be supplied to the reformer; a reformed gas passage through which the reformed gas generated by the reforming member flows to the combustion chamber; a bypass passage that has one end connected to the gas supply passage so as to bypass the reforming member and through which the fuel having passed through the reforming member is circulated to an upstream of the reforming member; a switching valve switched between a normal position that does not allow the fuel having passed through the reforming member to flow to the bypass passage and a circulating position that allows the fuel having passed through the reforming member to flow to the bypass passage; and a controller configured to control the fuel injection valve, the first throttle valve, the fuel supply member, the second throttle valve, and the switching valve, wherein the controller executes a first control process in which the fuel supply member and the second throttle valve are controlled so that the fuel and the air are supplied to the reforming member with the switching valve switched to the circulating position, and then executes a second control process in which the switching valve is controlled so that the switching valve is switched from the circulating position to the normal position and the first throttle valve and the fuel injection valve are controlled so that the air and the fuel are supplied to the combustion chamber.

In this engine system, at a start of the engine, the first control process in which the fuel supply member and the second throttle valve are controlled so that fuel and air are supplied to the reforming member with the switching valve switched to the circulating position. Then, combustion of the fuel takes place in the reforming member and the temperature of the reforming member is increased by heat of the combustion. However, the reforming member does not generate reformed gas containing hydrogen until a temperature of the reforming member reaches a temperature at which reforming can take place, and the fuel passes through the reforming member. The fuel having passed through the reforming member flows through the bypass passage and returns to an upstream of the reforming member. In this way, even when fuel passes through the reforming member, the fuel is circulated through the bypass passage. This prevents fuel from being discharged at a start of the engine.

The bypass passage has one end connected to the gas supply passage, the bypass passage has the other end connected to the exhaust gas passage, the switching valve is disposed in the exhaust gas passage, the normal position is a position that opens the exhaust gas passage and closes the bypass passage, the circulating position is a position that closes the exhaust gas passage and opens the bypass passage, and the controller may control the engine so that the engine cranks when executing the first control process. In this configuration, cranking of the engine generates a flow of gas in the intake gas passage and the exhaust gas passage, which allows the fuel having passed through the reforming member to flow through the engine to be circulated through the bypass passage. In this case, for example, the bypass passage and the switching valve may be easily realized by applying an exhaust gas recirculation (EGR) system of an engine. Further, an additional device for generating a flow of gas need not be provided.

The engine system further includes a temperature detection member that detects a temperature of the reforming member, the reforming member includes a reformer catalyst decomposing the fuel into hydrogen, when the controller executes the first control process, the controller controls the fuel supply member so that the fuel is supplied to the reforming member and, then, when the temperature of the reforming member detected by the temperature detection member becomes equal to or higher than a predetermined first specified temperature, the controller controls the fuel supply member and the second throttle valve so that the fuel and the air are supplied to the reforming member. According to this configuration, at an immediately after a start of the engine, the reforming member is supplied with only fuel and is not supplied with air, so that degradation of the reformer catalyst due to oxidation can be prevented.

When the controller executes the second control process, the controller may control the switching valve so that the switching valve is switched from the circulating position to the normal position, and control the first throttle valve and the fuel injection valve so that the air and the fuel are supplied to the combustion chamber, once the temperature of the reforming member detected by the temperature detection member becomes equal to or higher than a second specified temperature higher than the first specified temperature. According to this configuration, a timing at which the switching valve is switched from the circulating position to the normal position may be determined easily based on the detection value detected by the temperature detection member.

The bypass passage has one end connected to the gas supply passage, the bypass passage has the other end connected to the reformed gas passage, the switching valve is disposed in the reformed gas passage, the normal position is a position that opens the reformed gas passage and closes the bypass passage, the circulating position is a position that closes the reformed gas passage and opens the bypass passage, and a pump that suctions the fuel having passed through the reforming member may be disposed in the bypass passage.

According to this configuration, operating the pump produces a flow of gas in the reformed gas passage, which allows the fuel having passed through the reforming member to be circulated to the bypass passage. In this case, the fuel having passed through the reforming member may be returned to the upstream of the reforming member quickly by making the bypass passage shorter. As a result, the fuel may be heated quickly after the combustion starts.

The engine system further includes a temperature detection member that detects a temperature of the reforming member, the reforming member includes a reformer catalyst decomposing the fuel into hydrogen, when the controller executes the first control process, the controller controls the fuel supply member so that the fuel is supplied to the reforming member and, then, when the temperature of the reforming member detected by the temperature detection member becomes equal to or higher than a predetermined first specified temperature, the controller controls the fuel supply member and the second throttle valve so that the fuel and the air are supplied to the reforming member. According to this configuration, at an immediately after a start of the engine, the reforming member is supplied with only fuel and is not supplied with air, so that degradation of the reformer catalyst due to oxidation can be prevented.

When the controller executes the second control process, the controller controls the switching valve so that the switching valve is switched from the circulating position to the normal position, and controls the first throttle valve and the fuel injection valve so that the air and the fuel are supplied to the combustion chamber, once the temperature of the reforming member detected by the temperature detection member becomes equal to or higher than a second specified temperature higher than the first specified temperature. According to this configuration, a timing at which the switching valve is switched from the circulating position to the normal position may be determined easily based on the detection value detected by the temperature detection member.

The engine may be an ammonia engine using ammonia as fuel.

Ammonia burns more easily when ammonia is mixed with hydrogen in the combustion chamber of the engine. Therefore, it is effective to apply the engine system of the present invention to the ammonia engine. In this case, discharge of ammonia at a start of the ammonia engine is prevented.

Advantageous Effects of Invention

According to the present invention, discharge of fuel at a start of the engine can be prevented.

DESCRIPTION OF EMBODIMENTS

Figure 1:
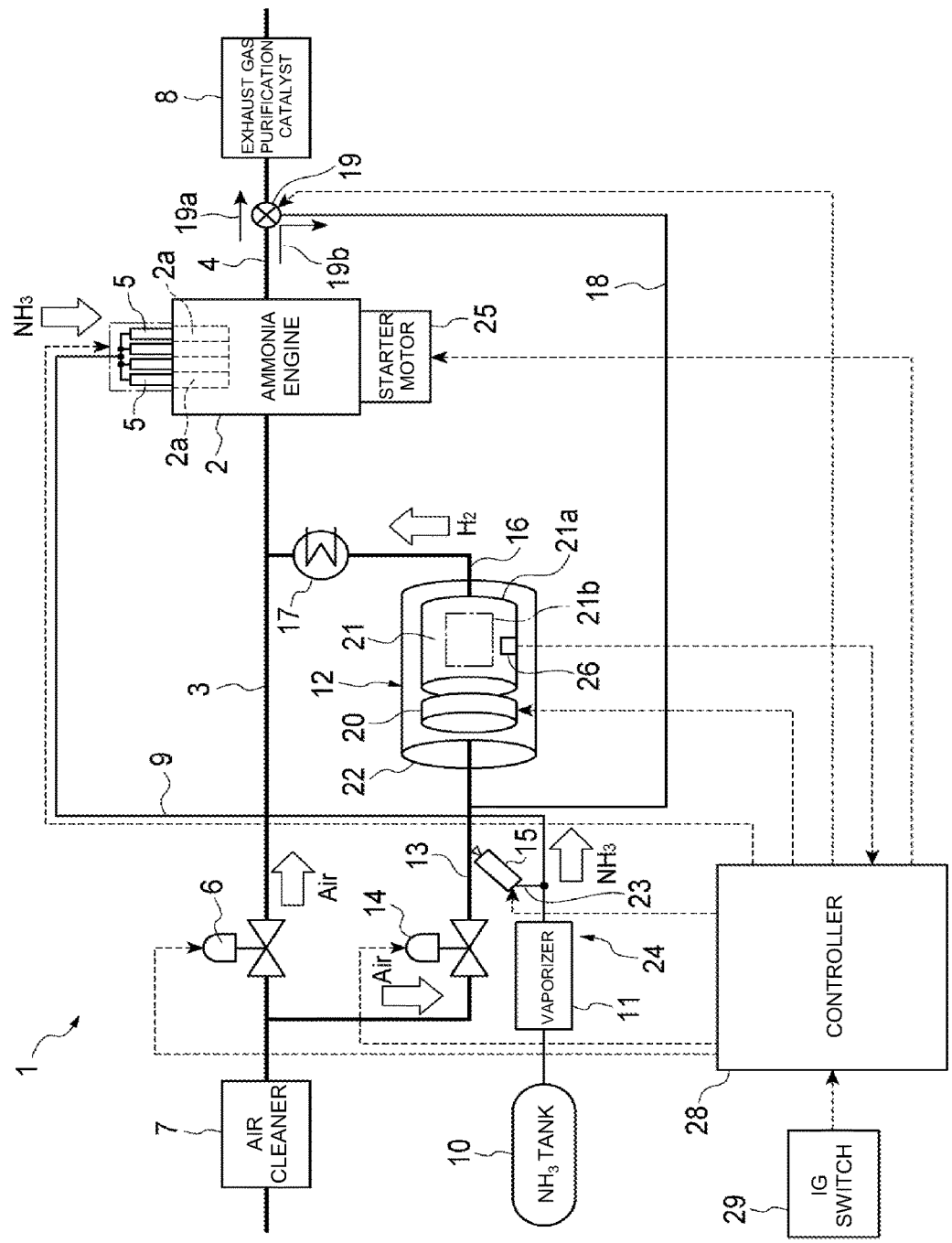
FIG. 1 is a schematic configuration view, illustrating an engine system according to a first embodiment of the present invention.

Hereinafter, embodiments of the present invention will be described in detail with reference to the accompanying drawings. In the drawings, the same or equivalent parts are designated by the same reference numerals and the redundant descriptions thereof are omitted.

FIG. 1 is a schematic configuration view, illustrating an engine system according to a first embodiment of the present invention. In FIG. 1, an engine system 1 of the present embodiment is mounted on a vehicle. The engine system 1 includes an ammonia engine 2, an intake gas passage 3, an exhaust gas passage 4, a plurality of main injectors 5 (four in the present embodiment), and a main throttle valve 6.

The ammonia engine 2 is an engine configured to use ammonia ($NH_3$) as a fuel. In the present embodiment, the ammonia engine 2 is a four-cylinder engine having four combustion chambers $2a$. Each of the combustion chambers $2a$ is supplied with hydrogen together with ammonia (which will be described later).

The intake gas passage 3 is connected to each of the combustion chambers $2a$ of the ammonia engine 2. The intake gas passage 3 is a passage through which air to be supplied to each of the combustion chambers 2a flows. An air cleaner 7, which removes foreign matters such as dust and particles included in air, is disposed in the intake gas passage 3.

The exhaust gas passage 4 is connected to each of the combustion chambers 2a of the ammonia engine 2. The exhaust gas passage 4 is a passage through which exhaust gas generated from each of the combustion chambers 2a flows. An exhaust gas purification catalyst 8, which removes hazardous materials such as nitrogen oxides (NOx) and ammonia contained in exhaust gas, is disposed in the exhaust gas passage 4. For example, a three-way catalyst, or a Selective Catalytic Reduction (SCR) catalyst is used for the exhaust gas purification catalyst 8.

The main injectors 5 are fuel injection valves of an electromagnetic type, which are configured to inject ammonia gas ($NH_3$ gas) as fuel into the combustion chambers 2a. Each of the main injectors 5 is connected to a vaporizer 11, which will be described later, through an ammonia flow passage 9.

A main throttle valve 6 is disposed between the air cleaner 7 and the ammonia engine 2 in the intake gas passage 3. The main throttle valve 6 corresponds to a first throttle valve of an electromagnetic type, which is configured to control the flow rate of air to be supplied to each of the combustion chambers 2a.

The engine system 1 includes an ammonia tank 10, the vaporizer 11, a reformer device 12, a gas supply passage 13, a reformer throttle valve 14, a reformer injector 15, a reformed gas passage 16, a cooler 17, a bypass passage 18, and a switching valve 19.

The ammonia tank 10 is a tank that stores ammonia in a liquid state. The vaporizer 11 vaporizes ammonia stored in a liquid state in the ammonia tank 10 to generate ammonia.

The reformer device 12 includes an electric heater 20, a reformer 21, and a housing 22 having a cylindrical shape and accommodating the electric heater 20 and the reformer 21. The electric heater 20 is disposed on the upstream side of the reformer 21 (the reformer injector 15 side) in the housing 22. The electric heater 20 heats ammonia gas supplied to the reformer 21. The electric heater 20 includes a heating element having, for example, a honeycomb structure, and generates heat when electric power is supplied. Passing inside the electric heater 20, ammonia gas is heated with the heat of the electric heater 20.

The reformer 21 is a reforming member that reforms the ammonia gas heated by the electric heater 20 to generate a reformed gas containing hydrogen. The reformer 21 includes a carrier 21a having, for example, a honeycomb structure. The carrier 21a is coated with a reformer catalyst 21b that decomposes ammonia gas into hydrogen. The reformer catalyst 21b has a function that burns ammonia gas, in addition to the function that decomposes ammonia gas into hydrogen. For example, ruthenium, palladium, rhodium, or platinum is used for the reformer catalyst 21b.

The gas supply passage 13 connects the intake gas passage 3 with the reformer 21. Specifically, the gas supply passage 13 has one end connected to part of the intake gas passage 3 between the air cleaner 7 and the main throttle valve 6 so that the gas supply passage 13 branches off from the intake gas passage 3. The other end of the gas supply passage 13 is connected to the reformer 21. The gas supply passage 13 is a passage through which air and ammonia gas to be supplied to the reformer 21 flow.

The reformer throttle valve 14 is disposed in the gas supply passage 13. The reformer throttle valve 14 corresponds to a second throttle valve of an electromagnetic type, which controls the flow rate of air to be supplied to the reformer 21.

The reformer injector 15 is connected to the vaporizer 11 through an ammonia flow passage 23. The reformer injector 15 is a fuel injection valve of an electromagnetic type, which is configured to inject ammonia gas as a fuel towards the reformer 21. Specifically, the reformer injector 15 injects ammonia gas into the gas supply passage 13 between the reformer throttle valve 14 and the reformer device 12. The ammonia tank 10, the vaporizer 11, the ammonia flow passage 23, the reformer injector 15 form a fuel supply member 24 that supplies ammonia gas to the reformer 21.

The reformed gas passage 16 connects the reformer 21 with the intake gas passage 3. Specifically, one end of the reformed gas passage 16 is connected to the reformer 21. The other end of the reformed gas passage 16 is connected to part of the intake gas passage 3 between the main throttle valve 6 and the ammonia engine 2 so that the reformed gas passage 16 branches off from the intake gas passage 3. The reformed gas passage 16 is a passage through which the reformed gas generated by the reformer 21 flows towards the combustion chambers 2a of the ammonia engine 2.

A cooler 17 is disposed in the reformed gas passage 16. The cooler 17 cools the reformed gas to be supplied to the combustion chambers 2a of the ammonia engine 2. The cooler 17 cools the reformed gas, for example, by heat exchange with an engine cooling water. Cooling the reformed gas by the cooler 17 suppresses the volume expansion of the reformed gas, which allows the reformed gas to enter the combustion chambers 2a easily.

A bypass passage 18 is connected to the gas supply passage 13 and the exhaust gas passage 4 so as to bypass the reformer device 12 and the ammonia engine 2. The bypass passage 18 is a passage that allows ammonia gas having passed through the reformer 21 to be circulated to an upstream of the reformer 21.

The bypass passage 18 has one end connected to part of the gas supply passage 13 between the reformer throttle valve 14 and the reformer device 12 so that the gas supply passage 18 branches off from the gas supply passage 13. More specifically, the one end of the bypass passage 18 is connected to part of the gas supply passage 13 between the reformer injector 15 and the reformer device 12 so that the gas supply passage 18 branches off from the gas supply passage 13. The bypass passage 18 has the other end connected to the exhaust gas passage 4 via the switching valve 19 so that the bypass passage 18 branches off from the exhaust gas passage 4. Specifically, the other end of the bypass passage 18 is connected to part of the exhaust gas passage 4 between the ammonia engine 2 and the exhaust gas purification catalyst 8 via the switching valve 19 so that the bypass passage 18 branches off from the exhaust gas passage 4.

The switching valve 19 is disposed in the exhaust gas passage 4 at a branching portion where the bypass passage 18 is branched off. The switching valve 19 is switched between a normal position 19a that does not allow ammonia gas having passed through the reformer 21 to flow to the bypass passage 18 and a circulating position 19b that allows the ammonia gas having passed through the reformer 21 to flow to the bypass passage 18. The normal position 19a is a position that opens the exhaust gas passage 4 and closes the bypass passage 18. The circulating position 19b is a position that closes the exhaust gas passage 4 and opens the bypass passage 18. A three-way valve of an electromagnetic type is used for the switching valve 19.

Further, the engine system 1 includes a starter motor 25, a temperature sensor 26, and a controller 28.

The starter motor 25 is a motor that starts the ammonia engine 2. The temperature sensor 26 corresponds to a temperature detection member that detects the temperature of the reformer 21. The temperature sensor 26 detects, for example, temperatures of the reformer catalyst 21b of the reformer 21.

The controller 28 is formed of a CPU, a RAM. a ROM, an input-output interface, and the like. An ignition switch 29 (IG switch) is connected to the controller 28. The ignition switch 29 is a manually operated switch for a driver of a vehicle to instruct a start and a stop of the ammonia engine 2.

Figure 2:
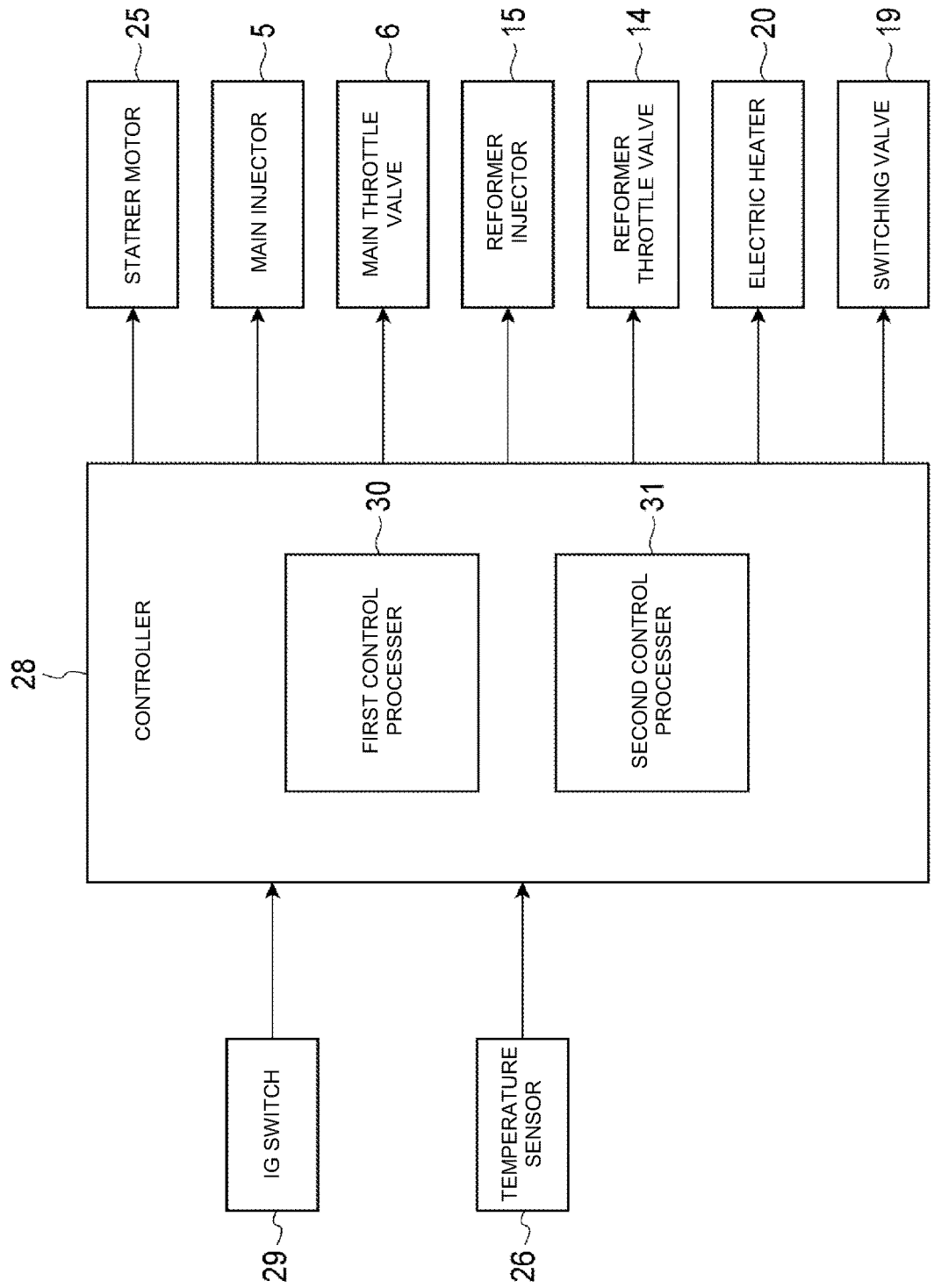
FIG. 2 is a block diagram, illustrating a configuration of a control system of the engine system illustrated in FIG. 1.

The controller 28 corresponds to a control member configured to control the main injector 5, the main throttle valve 6, the reformer throttle valve 14, the reformer injector 15, the electric heater 20, the switching valve 19, and the starter motor 25 based on an operation signal of the ignition switch 29 and a detection value detected by the temperature sensor 26 as illustrated in FIG. 2.

The controller 28 includes a first control processer 30 and a second control processer 31. The first control processer 30 and the second control processer 31 execute control processes at a start of the ammonia engine 2.

The first control processer 30 executes a first control process in which the reformer injector 15 and the reformer throttle valve 14 are controlled so as to supply ammonia gas and air to the reformer 21 with the switching valve 19 switched to the circulating position 19b.

When executing the first control process, the first control processer 30 controls the starter motor 25 so that the ammonia engine 2 cranks. In addition, when executing the first control process, the first control processer 30 controls the reformer injector 15 so that ammonia gas is supplied to the reformer 21, and, then, controls the reformer injector 15 and the reformer throttle valve 14 so that ammonia gas and air are supplied to the reformer 21 once the temperature of the reformer 21 detected by the temperature sensor 26 becomes equal to or higher than a predetermined first specified temperature (which will be described later).

After the first control processer 30 executes the first control process, the second control processer 31 executes a second control process in which the switching valve 19 is controlled so that the switching valve 19 is switched from the circulating position 19b to the normal position 19a and the main throttle valve 6 and the main injector 5 are controlled so as to supply air and ammonia gas to the combustion chambers 2a of the ammonia engine 2.

When executing the second control process, the second control processer 31 controls the switching valve 19 so that the switching valve 19 is switched from the circulating position 19b to the normal position 19a once the temperature of the reformer 21 detected by the temperature sensor 26 becomes equal to or higher than a second specified temperature (which will be described later), which is higher than the first specified temperature, and controls the main throttle valve 6 and the main injector 5 so that air and ammonia gas are supplied to the combustion chambers 2a.

Figure 3:
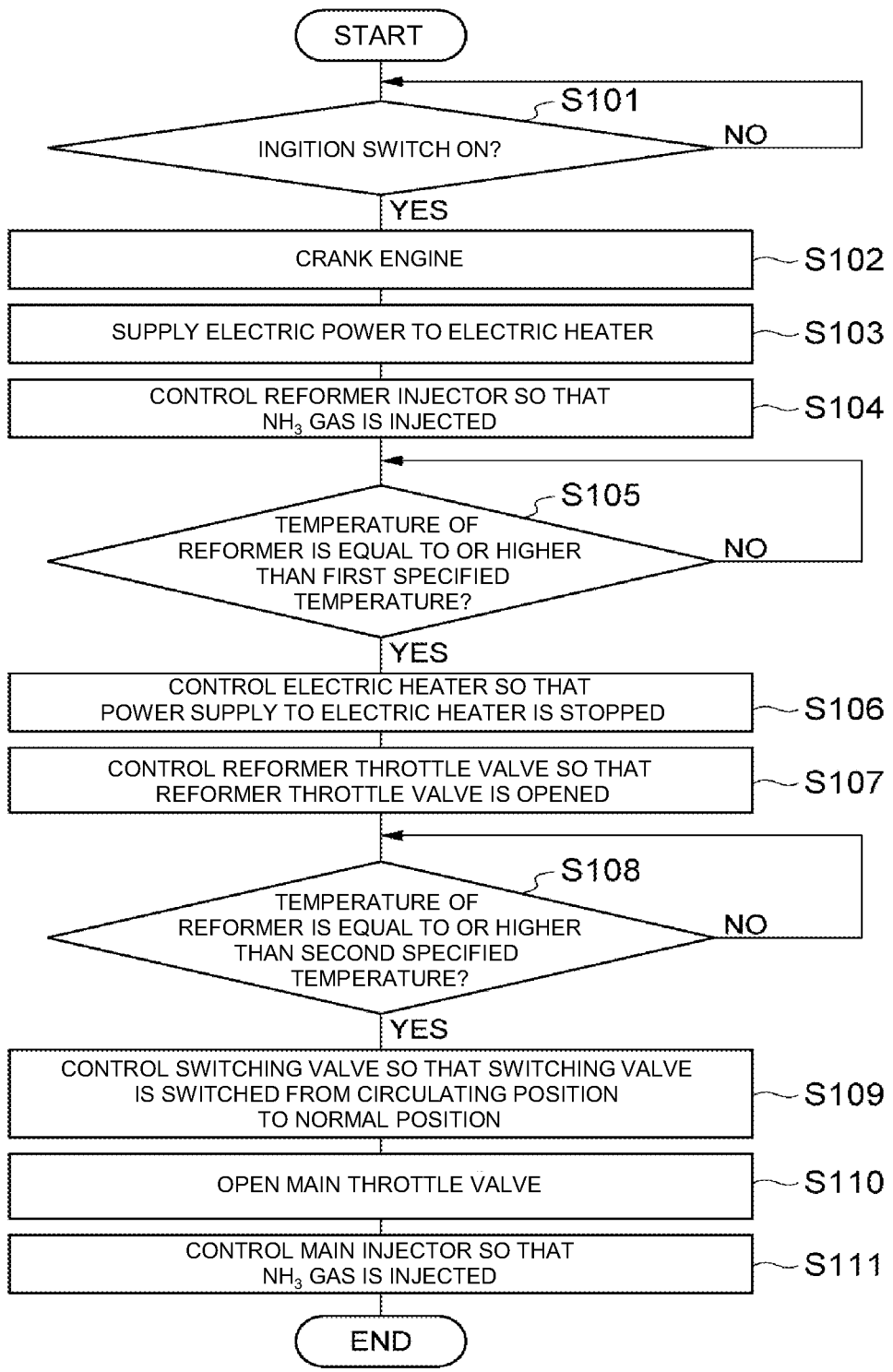
FIG. 3 is a flow chart illustrating details of a control process executed by a controller shown in FIG. 2.

FIG. 3 is a flow chart illustrating details of the control process executed by the controller 28. Before this process is executed, the main injector 5, the main throttle valve 6, the reformer throttle valve 14, and the reformer injector 15 are in a closed state. The switching valve 19 is in a state where it is switched to the circulating position 19b from the normal position 19a.

In FIG. 3, the controller 28 determines whether or not the ignition switch 29 is turned ON based on an operation signal from the ignition switch 29 (Step S101).

When it is determined that the ignition switch 29 is turned ON, the controller 28 controls the starter motor 25 so that the ammonia engine 2 cranks (Step S102). This starts the ammonia engine 2. Then, the controller 28 controls so that electric power is supplied to the electric heater 20 (Step S103). As a result, the electric heater 20 generates heat.

Subsequently, the controller 28 controls the reformer injector 15 so that ammonia gas is injected from the reformer injector 15 (Step S104). Thus, ammonia gas is supplied to the reformer 21. Since ammonia gas is heated by the electric heater 20, the heat of ammonia gas increases the temperature of the reformer 21.

Then, the controller 28 determines whether or not the temperature of the reformer 21 is equal to or higher than the first specified temperature based on the detection value detected by the temperature sensor 26 (Step S105). The first specified temperature is a temperature at which ammonia gas can burn, and is, for example, about 200° C. When it is determined that the temperature of the reformer 21 is equal to or higher than the first specified temperature, the controller 28 controls the electric heater 20 so that power supply to the electric heater 20 is stopped (Step S106).

The controller 28 controls the reformer throttle valve 14 so that the reformer throttle valve 14 is opened (Step S107). This allows air to be supplied to the reformer 21, so that combustion of ammonia gas occurs in the reformer 21, and the combustion heat further increases the temperature of the reformer 21. When the temperature of the reformer 21 increases to a temperature at which ammonia gas can be reformed (for example, about 300° C. to 400° C.), the reforming of ammonia gas starts in the reformer 21, which generates reformed gas containing hydrogen.

Subsequently, the controller 28 determines whether or not the temperature of the reformer 21 is equal to or higher than the second specified temperature based on the detection value detected by the temperature sensor 26 (Step S108). The second specified temperature is set to a temperature at which a sufficient amount of hydrogen that allows ammonia gas to burn stably in the ammonia engine 2 is generated, and is about 500° C. to 600° C.

When it is determined that the temperature of the reformer 21 is equal to or higher than the second specified temperature, the controller 28 controls the switching valve 19 so that the switching valve 19 is switched from the circulating position 19b to the normal position 19a (Step S109).

Subsequently, the controller 28 controls the main throttle valve 6 so that the main throttle valve 6 is opened (Step S110). Thus, air is supplied to the combustion chambers 2a of the ammonia engine 2. Then, the controller 28 controls the main injector 5 so that ammonia gas is injected from the main injector 5 (Step S111). Thus, ammonia gas is supplied to the combustion chambers 2a of the ammonia engine 2.

The first control processer 30 executes Steps S101 to S107. The second control processer 31 executes Steps S108 to S111.

In the engine system 1 described above, when the ignition switch 29 is turned ON, the ammonia engine 2 is started by the starter motor 25. Then, electric power is supplied to the electric heater 20, and the electric heater 20 generates heat.

Subsequently, ammonia gas is injected into the gas supply passage 13 from the reformer injector 15, and is supplied to the reformer 21. At this time, ammonia gas is heated by the electric heater 20. Since the reformer 21 is heated with the heat of the heated ammonia gas, the temperature of the reformer 21 increases.

Here, before the temperature of the reformer 21 reaches the first specified temperature, the ammonia gas is not reformed by the reformer 21, passes through the reformer 21, and is supplied to the ammonia engine 2. At this time, since the ammonia engine 2 is started, ammonia gas flows into the exhaust gas passage 4 through the ammonia engine 2, but the switching valve 19 is in the circulating position 19b. Therefore, the ammonia gas having passed through the ammonia engine 2 flows through the bypass passage 18 and returns to the gas supply passage 13, so that the ammonia gas hardly flows into the exhaust gas purification catalyst 8.

When the temperature of the reformer 21 reaches the first specified temperature, electric power supply to the electric heater 20 stops, which stops the heating of the ammonia gas by the electric heater 20. Then, the reformer throttle valve 14 is opened, and air is supplied to the reformer 21. Thus, ammonia gas is ignited by the reformer catalyst 21b of the reformer 21 and burns, and combustion heat generated thereby further increases the temperature of the reformer 21. Specifically, as shown in the formula below, chemical reaction (oxidation reaction) between part of ammonia and oxygen in the air causes combustion reaction of ammonia, thereby generating combustion heat.

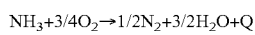

$$NH_3 + 3/4O_2 \rightarrow 1/2N_2 + 3/2H_2O + Q$$

When the temperature of the reformer 21 reaches the temperature at which the ammonia gas can be reformed, the reforming of ammonia gas by the reformer catalyst 21b of the reformer 21 starts, thereby generating the reformed gas containing hydrogen. Specifically, as shown in the formula below, the reforming reaction in which ammonia is decomposed into hydrogen and nitrogen takes place by the combustion heat of ammonia, thereby generating the reformed gas containing hydrogen and nitrogen.

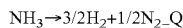

$$NH_3 \rightarrow 3/2H_2 + 1/2N_2 - Q$$

However, in a state where the amount of the ammonia gas flowing through the reformer 21 is large due to the low reforming rate of ammonia gas, the ammonia gas having flowed through the reformer 21 and the ammonia engine 2 is circulated through the bypass passage 18 as described above.

When the reformed gas rich in hydrogen is generated in the reformer 21 and the temperature of the reformer 21 reaches the second specified temperature, the switching valve 19 is switched from the circulating position 19b to the normal position 19a.

Subsequently, the main throttle valve 6 is opened, and air is supplied to the combustion chambers 2a of the ammonia engine 2. Thus, combustion of the reformed gas in the combustion chambers 2a takes place. Then, the ammonia gas is injected into the combustion chambers 2a from the main injector 5. Thus, the ammonia gas, together with hydrogen in the reformed gas, burns in the combustion chambers 2a. Accordingly, the engine system 1 is in normal operation after warming up of the reformer 21 is completed.

As has been described, according to the present embodiment, when the ammonia engine 2 is at a start, the first control process in which the reformer injector 15 and the reformer throttle valve 14 of the fuel supply member 24 are controlled so that the ammonia gas and air are supplied to the reformer 21 is executed with the switching valve 19 switched to the circulating position 19b. Thus, the combustion of the ammonia gas in the reformer 21 takes place, and the temperature of the reformer 21 is increased by the combustion heat. However, the reformer 21 does not generate reformed gas containing hydrogen until the temperature of the reformer 21 reaches the temperature at which reforming can take place, and ammonia gas passes through the reformer 21. Thus, the ammonia gas having passed through the reformer 21 flows through the bypass passage 18 and returns to the upstream of the reformer 21. Accordingly, even when ammonia gas passes through the reformer 21, the ammonia gas is circulated through the bypass passage 18. This prevents ammonia gas from being discharged at a start of the ammonia engine 2. As a result, since aftertreatment of the ammonia gas to be discharged to the outside of the engine system 1 is not required, the size of the exhaust gas purification catalyst 8 as an aftertreatment device can be made smaller. Further, it is unnecessary to provide an absorber for absorbing ammonia or the like as another aftertreatment device. In an ammonia engine using ammonia as fuel, ammonia burns more easily when ammonia is mixed with hydrogen in combustion chambers. Therefore, it is effective to apply the engine system of the present invention to the ammonia engine.

In the present embodiment, the one end of the bypass passage 18 is connected to the gas supply passage 13 and the other end of the bypass passage 18 is connected to the exhaust gas passage 4, and the ammonia engine 2 is controlled to crank when the first control process is executed. Cranking the ammonia engine 2 in this way produces a flow of gas in the intake gas passage 3 and the exhaust gas passage 4, which allows the ammonia gas having passed through the reformer 21 and flowed through the ammonia engine 2 to be circulated through the bypass passage 18. In this case, for example, an engine EGR (exhaust gas recirculation) system may be applied to realize the bypass passage 18 and the switching valve 19. Further, an additional device for generating a flow of gas need not be provided.

According to the present embodiment, immediately after a start of the ammonia engine 2, only the ammonia gas is supplied to the reformer 21 and air is not supplied to the reformer 21, and thus degradation of the reformer catalyst 21b of the reformer 21 due to oxidation may be prevented.

According to the present embodiment, a timing at which the switching valve 19 is switched from the circulating position 19b to the normal position 19a may be determined easily based on the detection value detected by the temperature sensor 26.

Figure 4:
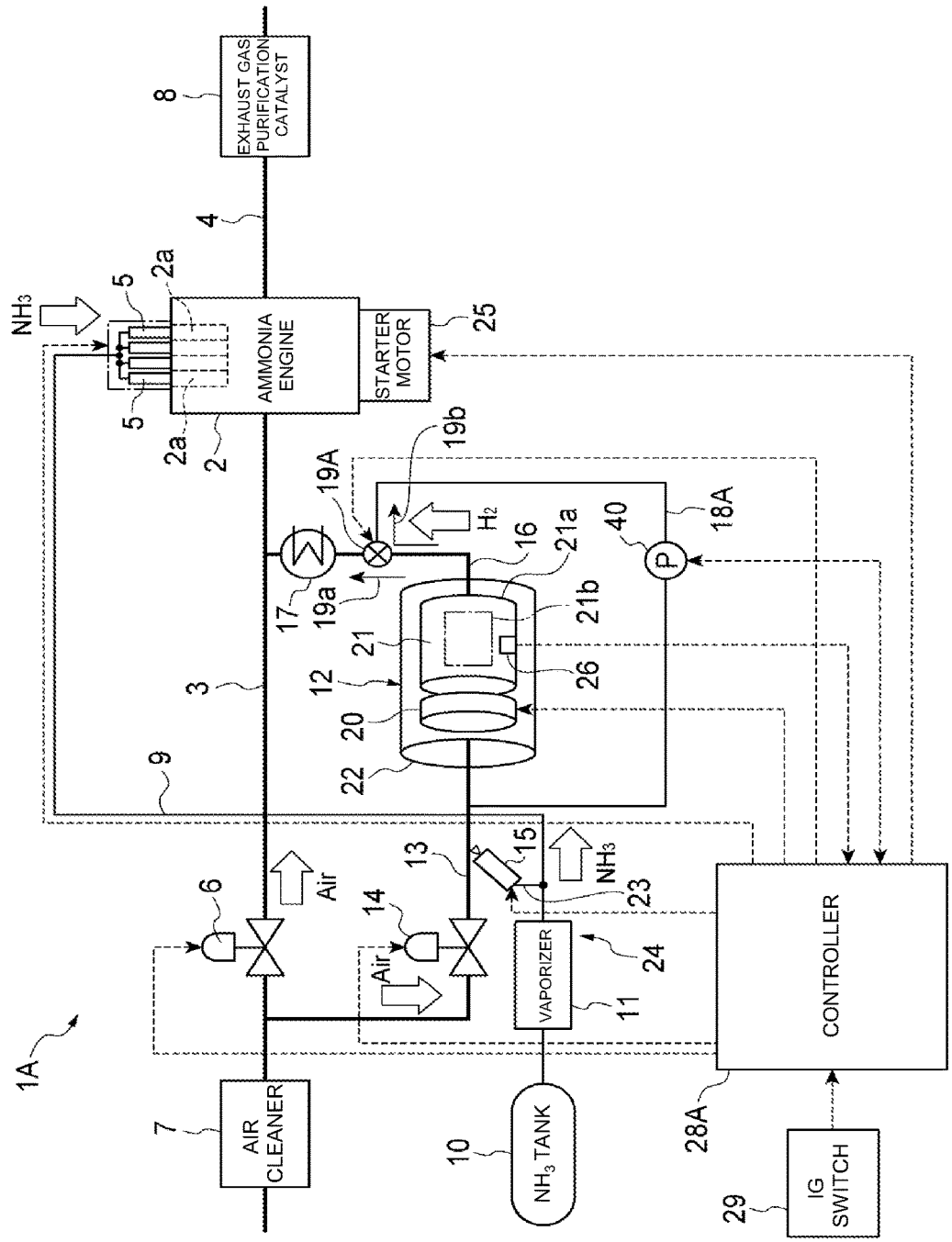
FIG. 4 is a schematic configuration view, illustrating an engine system according to a second embodiment of the present invention.

FIG. 4 is a schematic configuration view illustrating an engine system according to a second embodiment of the present invention. In FIG. 4, an engine system 1A of the present embodiment includes a bypass passage 18A and a switching valve 19A in a place of the bypass passage 18 and the switching valve 19 of the above-described first embodiment.

The bypass passage 18A is connected to the gas supply passage 13 and the reformed gas passage 16 so as to bypass the reformer device 12. The bypass passage 18A is a passage that allows the ammonia gas having passed through the reformer 21 to be circulated to the upstream of the reformer 21.

Similarly to the above-described bypass passage 18, the bypass passage 18A has one end connected to part of the gas supply passage 13 between the reformer throttle valve 14 and the reformer device 12 so that the bypass passage 18A branches off from the gas supply passage 13. The bypass passage 18A has the other end connected to the reformed gas passage 16 via the switching valve 19A so that the bypass passage 18A branches off from the reformed gas passage 16.

Specifically, the other end of the bypass passage 18A is connected to part of the reformed gas passage 16 between the reformer 21 and the cooler 17 via the switching valve 19A so that the bypass passage 18A branches off from the reformed gas passage 16.

A pump 40 that suctions the ammonia gas having passed through the reformer 21 to the upstream of the reformer 21 is disposed in the bypass passage 18A.

The switching valve 19A is disposed in the reformed gas passage 16 at a branching portion where the bypass passage 18A is branched off. The switching valve 19A is switched between the normal position 19a that does not allow the ammonia gas having passed through the reformer 21 to flow into the bypass passage 18A and the circulating position 19b that allows the ammonia gas having passed through the reformer 21 to flow into the bypass passage 18A. The normal position 19a is a position that opens the reformed gas passage 16 and closes the bypass passage 18A. The circulating position 19b is a position that closes the reformed gas passage 16 and opens the bypass passage 18A.

Figure 5:
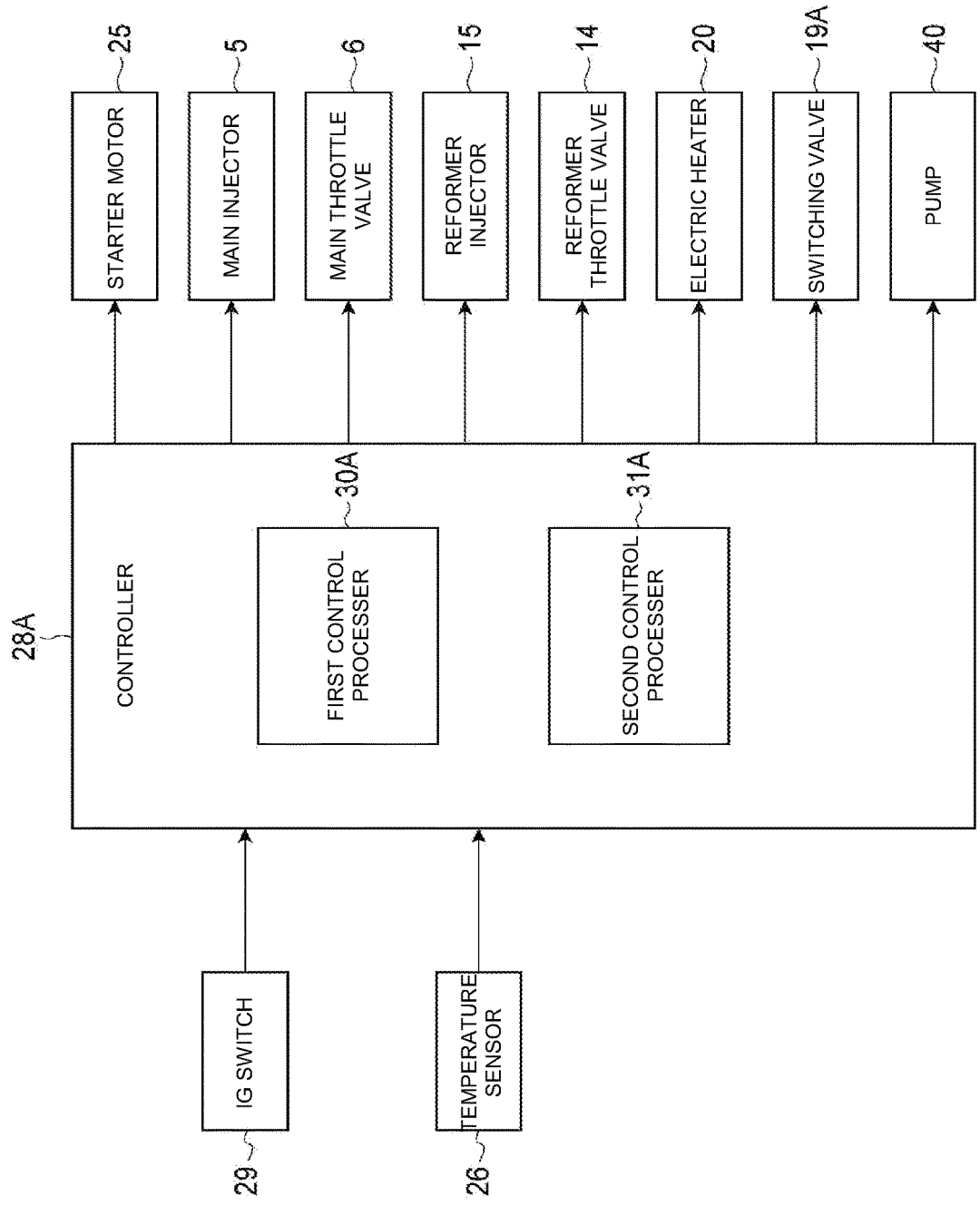
FIG. 5 is a block diagram, illustrating a configuration of a control system of the engine system illustrated in FIG. 4.

The engine system 1A includes a controller 28A in place of the controller 28 of the above-described first embodiment. As illustrated in FIG. 5, the controller 28A controls the main injector 5, the main throttle valve 6, the reformer throttle valve 14, the reformer injector 15, the electric heater 20, the switching valve 19A, the starter motor 25, and the pump 40 based on an operation signal of the ignition switch 29 and a detection value detected by the temperature sensor 26.

The controller 28A includes a first control processer 30A and a second control processer 31A. The first control processer 30A and the second control processer 31A execute control processes at a start of the ammonia engine 2.

The first control processer 30A executes a first control process in which the reformer injector 15 and the reformer throttle valve 14 are controlled so as to supply ammonia gas and air to the reformer 21 with the switching valve 19A switched to the circulating position 19b.

When executing the first control process, the first control processer 30A controls the reformer injector 15 so that ammonia gas is supplied to the reformer 21, and, then, controls the reformer injector 15 and the reformer throttle valve 14 so that ammonia gas and air are supplied to the reformer 21 once the temperature of the reformer 21 detected by the temperature sensor 26 becomes equal to or higher than a predetermined first specified temperature.

After the first control processer 30A executes the first control process, the second control processer 31A executes a second control process in which the switching valve 19A is controlled so that the switching valve 19A is switched from the circulating position 19b to the normal position 19a and the main throttle valve 6 and the main injector 5 are controlled so as to supply air and ammonia gas to the combustion chambers 2a of the ammonia engine 2.

When executing the second control process, the second control processer 31A controls the switching valve 19A so that the switching valve 19A is switched from the circulating position 19b to the normal position 19a once the temperature of the reformer 21 detected by the temperature sensor 26 becomes equal to or higher than the second specified temperature, which is higher than the first specified temperature, and controls the main throttle valve 6 and the main injector 5 so that air and ammonia gas are supplied to the combustion chambers 2a.

Figure 6:
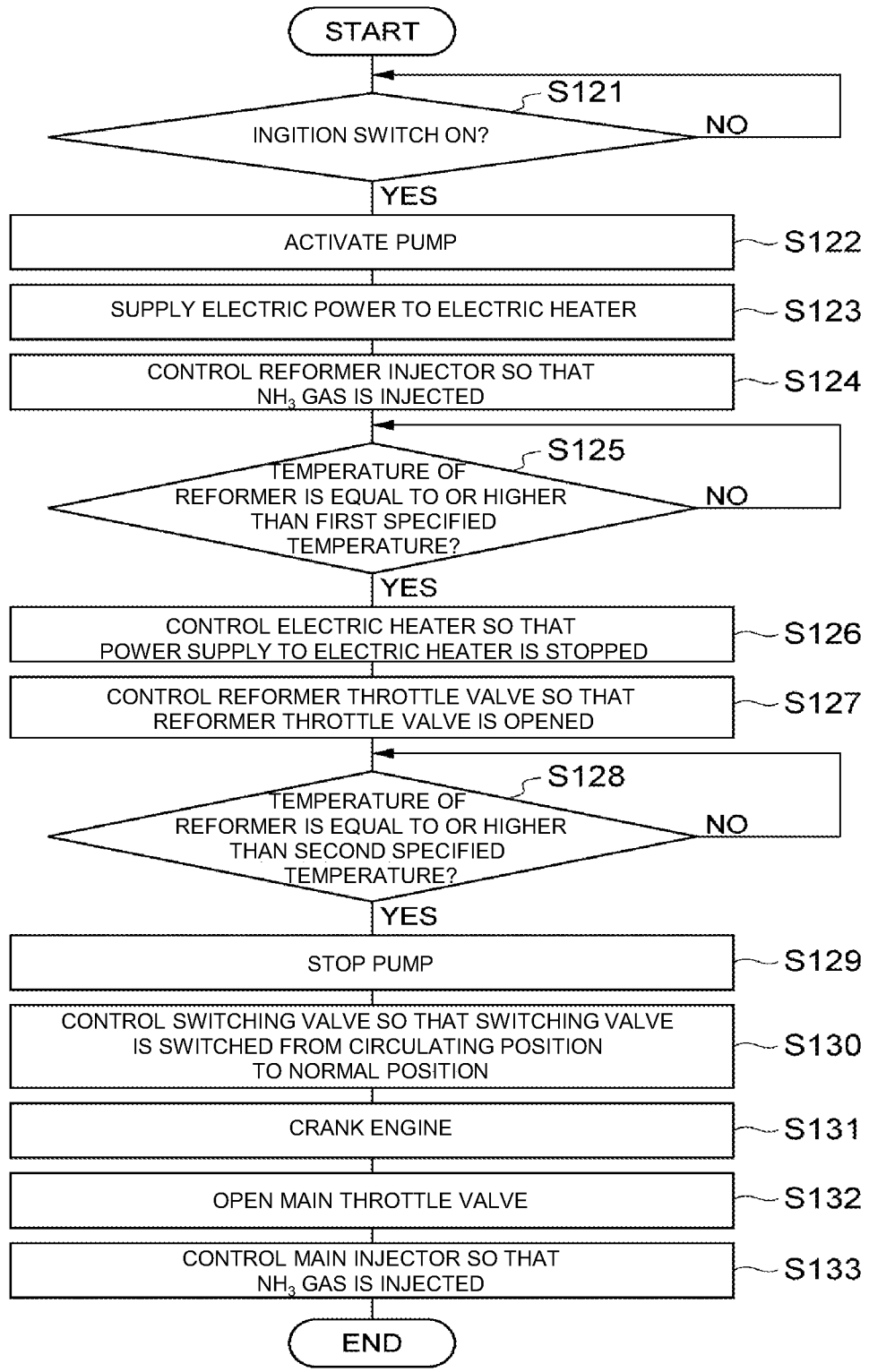
FIG. 6 is a flow chart, illustrating details of a control process executed by a controller shown in FIG. 5.

FIG. 6 is a flow chart illustrating details of the control processes executed by the controller 28A. Before this process is executed, the main injector 5, the main throttle valve 6, the reformer throttle valve 14, and the reformer injector 15 are in a closed state. The switching valve 19A is in a state where it is switched to the circulating position 19b from the normal position 19a.

In FIG. 6, the controller 28A first determines whether or not the ignition switch 29 is turned ON based on an operation signal from the ignition switch 29 (Step S121).

When it is determined that the ignition switch 29 is turned ON, the controller 28A controls the pump 40 so that the pump 40 is activated (Step S122). Additionally, the controller 28A controls the electric heater 20 so that electric power is supplied to the electric heater 20 (Step S123). As a result, the electric heater 20 generates heat.

Subsequently, the controller 28A controls the reformer injector 15 so that ammonia gas is injected from the reformer injector 15 (Step S124). Thus, ammonia gas is supplied to the reformer 21. At this time, since ammonia gas is heated by the electric heater 20, the heat of ammonia gas increases the temperature of the reformer 21.

Then, the controller 28A determines whether or not the temperature of the reformer 21 is equal to or higher than the first specified temperature based on the detection value detected by the temperature sensor 26 (Step S125). When it is determined that the temperature of the reformer 21 is equal to or higher than the first specified temperature, the controller 28A controls the electric heater 20 so that electric power supply to the electric heater 20 is stopped (Step S126).

The controller 28A controls the reformer throttle valve 14 so that the reformer throttle valve 14 is opened (Step S127). This allows air to be supplied to the reformer 21, so that combustion of ammonia gas occurs in the reformer 21, and the combustion heat further increases the temperature of the reformer 21. When the temperature of the reformer 21 increases to a temperature at which ammonia can be reformed, the reforming of ammonia gas starts in the reformer 21, which generates reformed gas containing hydrogen.

Then, the controller 28A determines whether or not the temperature of the reformer 21 is equal to or higher than the second specified temperature based on the detection value detected by the temperature sensor 26 (Step S128). When it is determined that the temperature of the reformer 21 is equal to or higher than the second specified temperature, the controller 28A controls the pump 40 so that pump 40 stops (Step S129). The controller 28A controls the switching valve 19A so that the switching valve 19A is switched from the circulating position 19b to the normal position 19a (Step S130).

Subsequently, the controller 28A controls the starter motor 25 so that the ammonia engine 2 cranks (Step S131). This starts the ammonia engine 2. The controller 28A controls the main throttle valve 6 so that the main throttle valve 6 is opened (Step S132). Thus, air is supplied to the combustion chambers 2a of the ammonia engine 2. Then, the controller 28A controls the main injector 5 so that ammonia gas is injected from the main injector 5 (Step S133). Thus, ammonia gas is supplied to the combustion chambers 2a.

The first control processer 30A executes Steps S121 to S127. The second control processer 31A executes Steps S128 to S133.

In the engine system 1A as described above, when the ignition switch 29 is turned ON, the pump 40 is started. With electric power supplied to the electric heater 20, the electric heater 20 generates heat.

Subsequently, ammonia gas is injected into the gas supply passage 13 from the reformer injector 15, and is supplied to the reformer 21. At this time, ammonia gas is heated by the electric heater 20. Since the reformer 21 is heated with the heat of the heated ammonia gas, the temperature of the reformer 21 increases.

Here, before the temperature of the reformer 21 reaches the first specified temperature, ammonia gas is not reformed by the reformer 21, and passes through the reformer 21. At this time, the switching valve 19A is in the circulating position 19b. Therefore, the ammonia gas having passed through the reformer 21 flows through the bypass passage 18A and returns to the gas supply passage 13, so that the ammonia gas is not supplied to the ammonia engine 2.

When the temperature of the reformer 21 reaches the first specified temperature, electric power supply to the electric heater 20 stops, which stops the heating of the ammonia gas by the electric heater 20. Then, the reformer throttle valve 14 is opened, and air is supplied to the reformer 21. Thus, ammonia gas is ignited by the reformer catalyst 21b of the reformer 21 and burns, and combustion heat generated thereby further increases the temperature of the reformer 21.

When the temperature of the reformer 21 reaches the temperature at which the ammonia gas can be reformed, the reforming of ammonia gas by the reformer catalyst 21b of the reformer 21 starts, thereby generating the reformed gas containing hydrogen. However, in a state where the amount of the ammonia gas flowing through the reformer 21 is large due to the low reforming rate of ammonia gas, the ammonia gas having passed through the reformer 21 is circulated through the bypass passage 18A as described above.

When the reformed gas rich in hydrogen is generated in the reformer 21 and the temperature of the reformer 21 reaches the second specified temperature, the operation of the pump 40 is stopped and the switching valve 19A is switched from the circulating position 19b to the normal position 19a. Thus, reformed gas is supplied to the combustion chambers 2a of the ammonia engine 2. Then, the ammonia engine 2 is started by the starter motor 25.

Subsequently, the main throttle valve 6 is opened and air is supplied to the combustion chambers 2a. Thus, combustion of the reformed gas in the combustion chambers 2a takes place. Then, the ammonia gas is injected into the combustion chambers 2a from the main injector 5. Thus, the ammonia gas, together with hydrogen in the reformed gas, burns in the combustion chambers 2a.

As described above, in the present embodiment, similarly to the above-described first embodiment, even when the ammonia gas passes through the reformer 21, the ammonia gas is circulated through the bypass passage 18A. This prevents ammonia gas from being discharged at a start of the ammonia engine 2.

Further, in the present embodiment, the one end of the bypass passage 18A is connected to the gas supply passage 13, and the other end of the bypass passage 18A is connected to the reformed gas passage 16, and the pump 40, which suctions the ammonia gas having passed through the reformer 21, is disposed in the bypass passage 18A. Operating this pump 40 produces a flow of gas in the reformed gas passage 16, which allows the ammonia gas having passed through the reformer 21 to be circulated through the bypass passage 18A. In this case, the ammonia gas having passed through the reformer 21 may be returned to the upstream of the reformer 21 quickly by making the bypass passage 18A shorter. As a result, ammonia gas may be heated quickly after the combustion starts.

Although the other end of the bypass passage 18A is connected to part of the reformed gas passage 16 between the reformer 21 and the cooler 17 in the present embodiment, a part to which the other end of the bypass passage 18A is connected to is not specifically limited thereto, but may be a part of the reformed gas passage 16 between the cooler 17 and the intake gas passage 3. In this case, the cooler 17 may be configured to be turned on and off as required.

Although the embodiments of the present inventions have described above, the present invention is not limited to the above-described embodiments. For example, although a timing at which the reformer throttle valve 14 is opened is controlled based on the detection value detected by the temperature sensor 26 in the above-described embodiments, it is not limited thereto. Since the temperature of the reformer 21 can be estimated, for example, from the flow rate of ammonia gas, the flow rate of air, time, and the room temperature, a timing at which the reformer throttle valve 14 is opened may be controlled based on an elapsed time after the ignition switch 29 is turned on. Similarly, a timing at which the switching valve 19 is switched from the circulating position 19b to the normal position 19a may be controlled based on the elapsed time after the ignition switch 29 is turned on.

Additionally, although each of the one ends of the bypass passages 18, 18A is connected to part of the gas supply passage 13 between the reformer injector 15 and the reformer device 12 in the above embodiments, it is not specifically limited thereto. For example, in a case where the reformer injector 15 has a great heat resistance, each of the one ends of the bypass passages 18, 18A may be connected to part of the gas supply passage 13 between the reformer throttle valve 14 and the reformer injector 15.

Although the reformer 21 is firstly only supplied with ammonia gas, and, then, supplied with ammonia gas and air in the above-described embodiments, it is not specifically limited thereto, and the reformer 21 may be supplied with ammonia gas and air simultaneously from a start.

Although ammonia gas is heated by the electric heater 20 and the reformer 21 is heated with the heat of the ammonia gas heated by the electric heater 20 in the above-described embodiments, it is not specifically limited thereto, and the reformer 21 may be directly heated by the electric heater 20.

Although the above-described embodiments include the reformer injector 15 that injects ammonia gas towards the reformer 21, it is not specifically limited thereto, and may include, for example, a flow control valve, instead of the reformer injector 15. In this case, the ammonia flow passage 23 is connected to the gas supply passage 13 and the flow control valve is disposed in the ammonia flow passage 23. The use of the flow control valve permits supplying ammonia gas continuously to the reformer 21.

Further, although the other end of the reformed gas passage 16 is connected to the intake gas passage 3 in the above-described embodiments, it is not limited thereto, and an injector that injects reformed gas towards the ammonia engine 2 or the intake gas passage 3 may be provided on the other end of the reformed gas passage 16.

Although the engine systems 1, 1A of the above-described embodiments are provided with the ammonia engine 2 that uses ammonia as fuel, the present invention is not specifically limited to the ammonia engine, but is applicable to an engine that needs reformed gas containing hydrogen.

REFERENCE SIGNS LIST 1, 1A engine system
2 ammonia engine (engine)
2a combustion chamber
3 intake gas passage 4 exhaust gas passage
5 main injector (fuel injection valve)
6 main throttle valve (first throttle valve)
13 gas supply passage
14 reformer throttle valve (second throttle valve)
16 reformer gas passage
18, 18A bypass passage
19, 19A switching valve
19a normal position
19b circulating position
21 reformer (reforming member)
21b reformer catalyst
24 fuel supply member
25 starter motor
26 temperature sensor (temperature detection member)
28, 28A controller (control unit)
30, 30A first control processing unit
31, 31A second control processing unit
40 pump

The invention claimed is:

1. An engine system comprising:
an engine having a combustion chamber;
an intake gas passage through which air to be supplied to the combustion chamber flows;
an exhaust gas passage through which exhaust gas generated from the combustion chamber flows;
a fuel injection valve from which a fuel is injected to the combustion chamber;
a first throttle valve disposed in the intake gas passage and configured to control a flow rate of the air to be supplied to the combustion chamber;
a reforming member configured to reform the fuel to generate a reformed gas containing hydrogen;
a gas supply passage through which the air to be supplied to the reforming member flows;
a fuel supply member configured to supply the fuel to the reforming member;
a second throttle valve disposed in the gas supply passage and configured to control a flow rate of the air to be supplied to the reforming member;
a reformed gas passage through which the reformed gas generated by the reforming member flows to the combustion chamber;
a bypass passage that has one end connected to the gas supply passage so as to bypass the reforming member and through which the fuel having passed through the reforming member flows to an upstream of the reforming member;
a switching valve switched between a normal position that does not allow the fuel having passed through the reforming member to flow to the bypass passage and a circulating position that allows the fuel having passed through the reforming member to flow to the bypass passage; and
a controller configured to control the fuel injection valve, the first throttle valve, the fuel supply member, the second throttle valve, and the switching valve, wherein
the controller executes a first control process in which the fuel supply member and the second throttle valve are controlled so that the fuel and the air are supplied to the reforming member with the switching valve switched to the circulating position, and then, the controller executes a second control process in which the switching valve is controlled so that the switching valve is switched from the circulating position to the normal position and the first throttle valve and the fuel injection valve are controlled so that the air and the fuel is supplied to the combustion chamber.

2. The engine system according to claim 1, wherein
the bypass passage has the one end connected to the gas supply passage,
the bypass passage has the other end connected to the exhaust gas passage,
the switching valve is disposed in the exhaust gas passage,
the normal position is a position that opens the exhaust gas passage and closes the bypass passage,
the circulating position is a position that closes the exhaust gas passage and opens the bypass passage, and
the controller controls the engine so that the engine cranks when the controller executes the first control process.

3. The engine system according to claim 2, further comprising
a temperature detection member configured to detect a temperature of the reforming member, wherein
the reforming member includes a reformer catalyst that decomposes the fuel into hydrogen, and
when the controller executes the first control process, the controller controls the fuel supply member so that the fuel is supplied to the reforming member, and, once the temperature of the reforming member detected by the temperature becomes equal to or higher than a first specified temperature, the controller controls the fuel supply member and the second throttle valve so that the fuel and the air are supplied to the reforming member.

4. The engine system according to claim 3, wherein
when the controller executes the second control process, the controller controls the switching valve so that the switching valve is switched from the circulating position to the normal position, and controls the first throttle valve and the fuel injection valve so that the air and the fuel are supplied to the combustion chamber, once the temperature of the reforming member detected by the temperature detection member becomes equal to or higher than a second specified temperature higher than the first specified temperature.

5. The engine system according to claim 1, wherein
the bypass passage has the one end connected to the gas supply passage,
the bypass passage has the other end connected to the reformed gas passage,
the switching valve is disposed in the reformed gas passage,
the normal position is a position that opens the reformed gas passage and closes the bypass passage,
the circulating position is a position that closes the reformed gas passage and opens the bypass passage, and
a pump configured to suction the fuel having passed through the reforming member is disposed in the bypass passage.

6. The engine system according to claim 5, further comprising
a temperature detection member configured to detect a temperature of the reforming member, wherein
the reforming member includes a reformer catalyst that decomposes the fuel into hydrogen, and
when the controller executes the first control process, the controller controls the fuel supply member so that the fuel is supplied to the reforming member, and, once the temperature of the reforming member detected by the temperature becomes equal to or higher than a first specified temperature, the controller controls the fuel supply member and the second throttle valve so that the fuel and the air are supplied to the reforming member.

7. The engine system according to claim 6, wherein when the controller executes the second control process, the controller controls the switching valve so that the switching valve is switched from the circulating position to the normal position, and controls the first throttle valve and the fuel injection valve so that the air and the fuel are supplied to the combustion chamber, once the temperature of the reforming member detected by the temperature detection member becomes equal to or higher than a second specified temperature higher than the first specified temperature.

8. The engine system according to claim 1, wherein the engine is an ammonia engine using ammonia as the fuel.

* * * * *